C. G. Imlay,
Fruit-Jar Holder,
Nº 50,301. Patented Oct. 3, 1865.

Witnesses:
Wm. Albert Steel.
John Parker.

Inventor:
C. G. Imlay.
by his Attorney.
H. Howson
per C. Fosler

UNITED STATES PATENT OFFICE.

CHARLES G. IMLAY, OF PHILADELPHIA, PENNSYLVANIA, ASSIGNOR TO HIMSELF AND C. C. LATHROP, OF SAME PLACE.

IMPROVED HOLDER FOR FRUIT-JARS.

Specification forming part of Letters Patent No. 50,301, dated October 3, 1865.

*To all whom it may concern:*

Be it known that I, C. G. IMLAY, of Philadelphia, Pennsylvania, have invented a Holder for Preserve-Jars; and I do hereby declare the following to be a full, clear, and exact description of the same, reference being had to the accompanying drawings, and to the letters of reference marked thereon.

My invention consists in a metal holder or frame constructed substantially as described hereinafter, and adapted for the reception of preserve-jars, so that the latter, with their contents, may be readily heated without the necessity of handling the same separately, and thus exposing them to the danger of being broken.

In order to enable others skilled in the art to make and use my invention, I will now proceed to describe its construction and operation.

Figure 1:
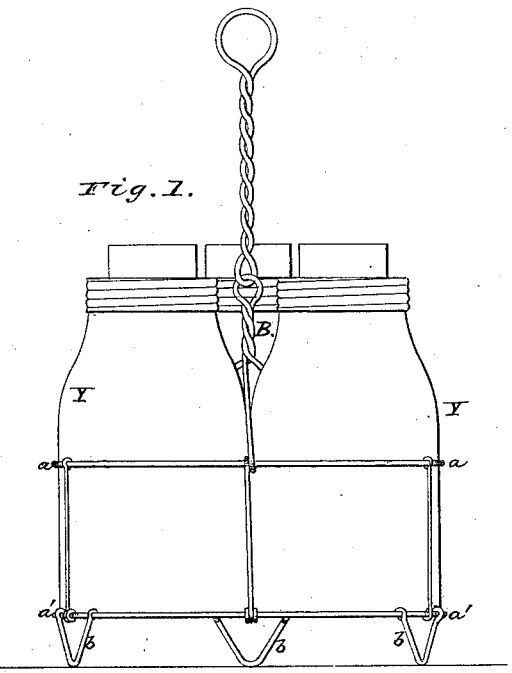
Figure 2:
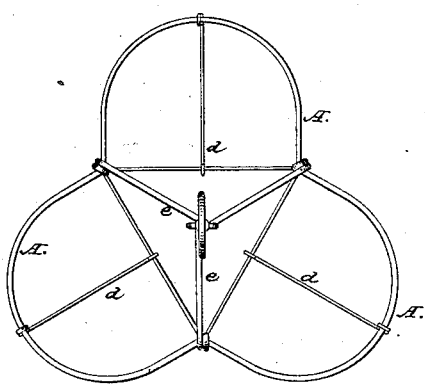

On reference to the accompanying drawings, which form a part of this specification, Figure 1 is a side view of my improved jar-holder, and Fig. 2 a plan view.

Before sealing jars which are filled with fruit, vegetables, or other substances to be preserved, the jars, with their contents, are first heated by placing them in a heated oven or in water which is gradually brought to the required temperature. During the various manipulations required in introducing the jars into and taking them from the water or the oven, many of the jars, owing to the difficulty of handling them while in a heated state, are cracked or broken, and a great expense is thus entailed, which is still further increased when the breakage is accompanied with the loss of the fruit in the jar.

In order to overcome these difficulties I make a frame or holder, A, of wire or other thin strips of metal, and of a shape and capacity adapted for the reception of any desired number of jars, a holder for containing three jars being shown in the drawings.

To the edge of the strip $a'$ at the bottom of the holder are attached the lugs or feet $b$, and to the upper edge strip, $a$, are secured the ends of strips $c\,c\,c$, the inner ends of which are twisted together so as to form a handle, B. Strips $d\,d\,d$ extend from one side to the other of the lower edge strip, $a'$, and on these strips rest the jars or bottles Y.

When the jars and their contents are to be heated the holder is raised by the handle B and is introduced into a vessel containing cold water, the holder resting on the bottom of the vessel. The water is then gradually heated, the holder and the jars remaining in the same until the contents of the latter are cooked to the extent required.

As the jars are maintained from contact with the bottom of the vessel or oven by the feet $b$, the unequal heating and cracking of the bottoms of the jars, which frequently occur when no holder is used, are avoided, while the water or heated air obtains free access to every portion of the jars and quickly heats the same. The holder, with the jars in the same, is now removed from the heated water or oven and is placed to one side, so that the jars and their contents may be cooled before removal from the holder, the handling of the heated jars and risk of breaking the same by bringing them suddenly into contact with any cool object being thus avoided.

It will be seen that by the use of this holder the various operations on the jars are performed without the necessity of the attendant handling the same, excepting to place them on or remove them from the holder, and that consequently the loss of the jars from breakage in the manner above described is rendered almost impossible.

It will also be seen that when placed in the holder the jars are retained in an upright position and cannot be overturned by the motion of the water while boiling. The position of the holder and the jars may also be readily changed, when it is required, in order to insure the equal heating of the contents. Where the jars are heated by introducing them into an oven, handles may be secured to the side of the holder instead of to the center, as represented in the drawings.

It will be apparent that holders adapted to jars of any shape and for the reception of any number of jars may be used.

I claim as my invention and desire to secure by Letters Patent—

The holder A, with its feet $b$, constructed and adapted for the reception of preserving-jars, as described, so that the jars may be maintained free from contact with the bottom of the vessel or oven in which they are heated.

In testimony whereof I have signed my name to this specification in the presence of two subscribing witnesses.

C. G. IMLAY.

Witnesses:
CHARLES E. FOSTER,
JOHN WHITE.